Nov. 20, 1928.  
E. H. THOMAS  
1,692,595  
LOCKING MECHANISM  
Filed July 27, 1926  
2 Sheets-Sheet 1
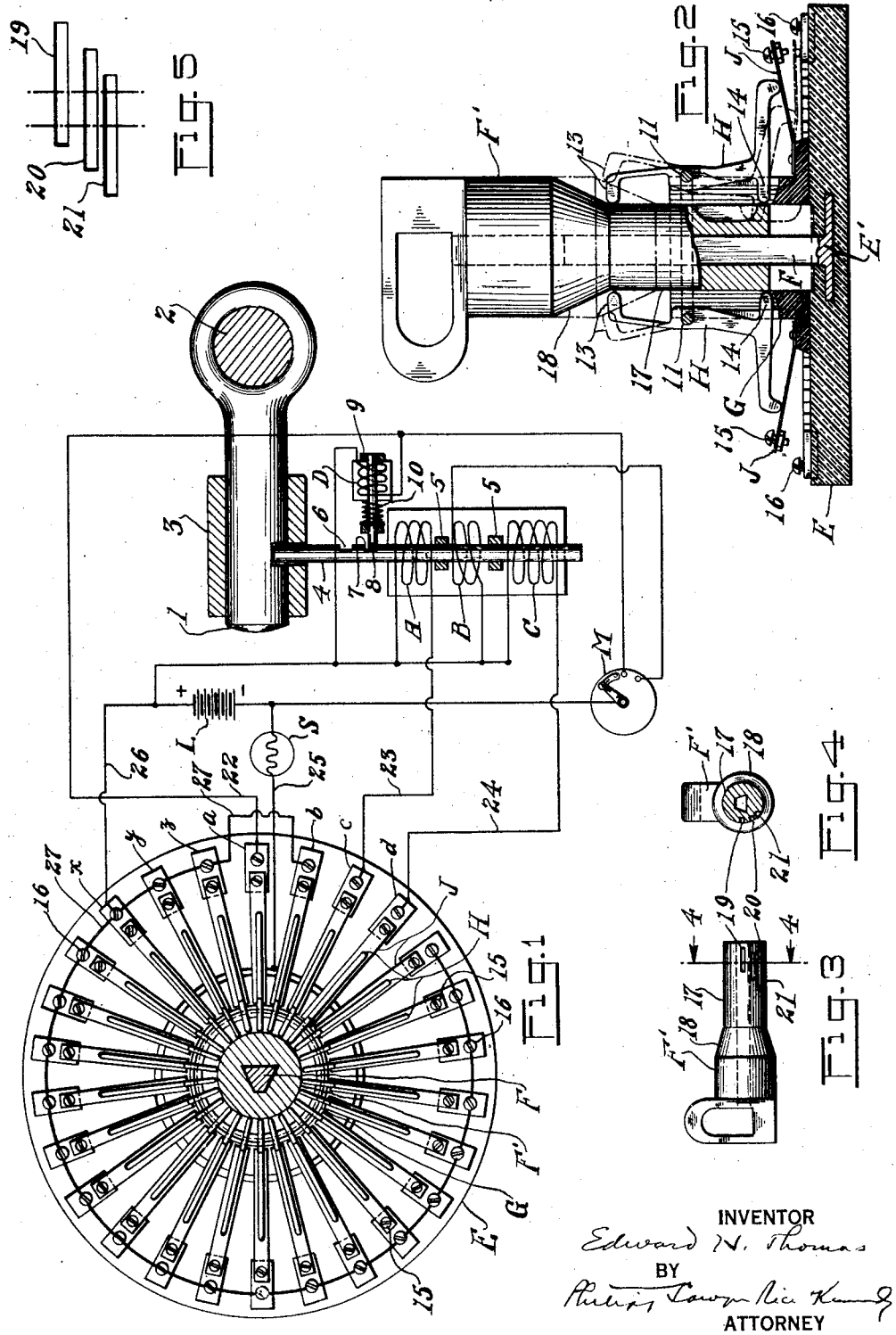
INVENTOR  
Edward H. Thomas  
BY  
ATTORNEY Nov. 20, 1928.

E. H. THOMAS 1,692,595

LOCKING MECHANISM

Filed July 27, 1926

INVENTOR
Edward H Thomas
BY
ATTORNEY

Patented Nov. 20, 1928.

1,692,595

UNITED STATES PATENT OFFICE.

EDWARD H. THOMAS, OF EAST ORANGE, NEW JERSEY.

LOCKING MECHANISM.

Application filed July 27, 1926. Serial No. 125,223.

This invention relates to improvements in locking mechanism, and particularly to automobile locking mechanism.

The object of the invention is to provide a locking device which will be reliable and safe. A further object is to provide a locking device in which the place for the insertion of the key may be remote from the bolt mechanism. A further object is to provide a locking device especially suitable for locking the mechanism of an automobile, or other machine, against unauthorized operation, by the use of a selector switch and a special key therefor, so that it cannot be unlocked except by one having the proper key.

With the above objects in view and some others which will be obvious to those skilled in the art from the description hereinafter, the invention consists in the features, details of construction and combination of parts which will first be described in connection with the accompanying drawings illustrating one embodiment of the invention and then more particularly pointed out in the claims.

In the drawings—

Figure 1 is a diagrammatic view of a locking mechanism embodying the invention as applied to an automobile;

Figure 2 is a side elevation of the key-actuated switch mechanism;

Figure 3 is a side elevation of a key for operating the switch mechanism;

Figure 4 is an end view;

Figure 6:
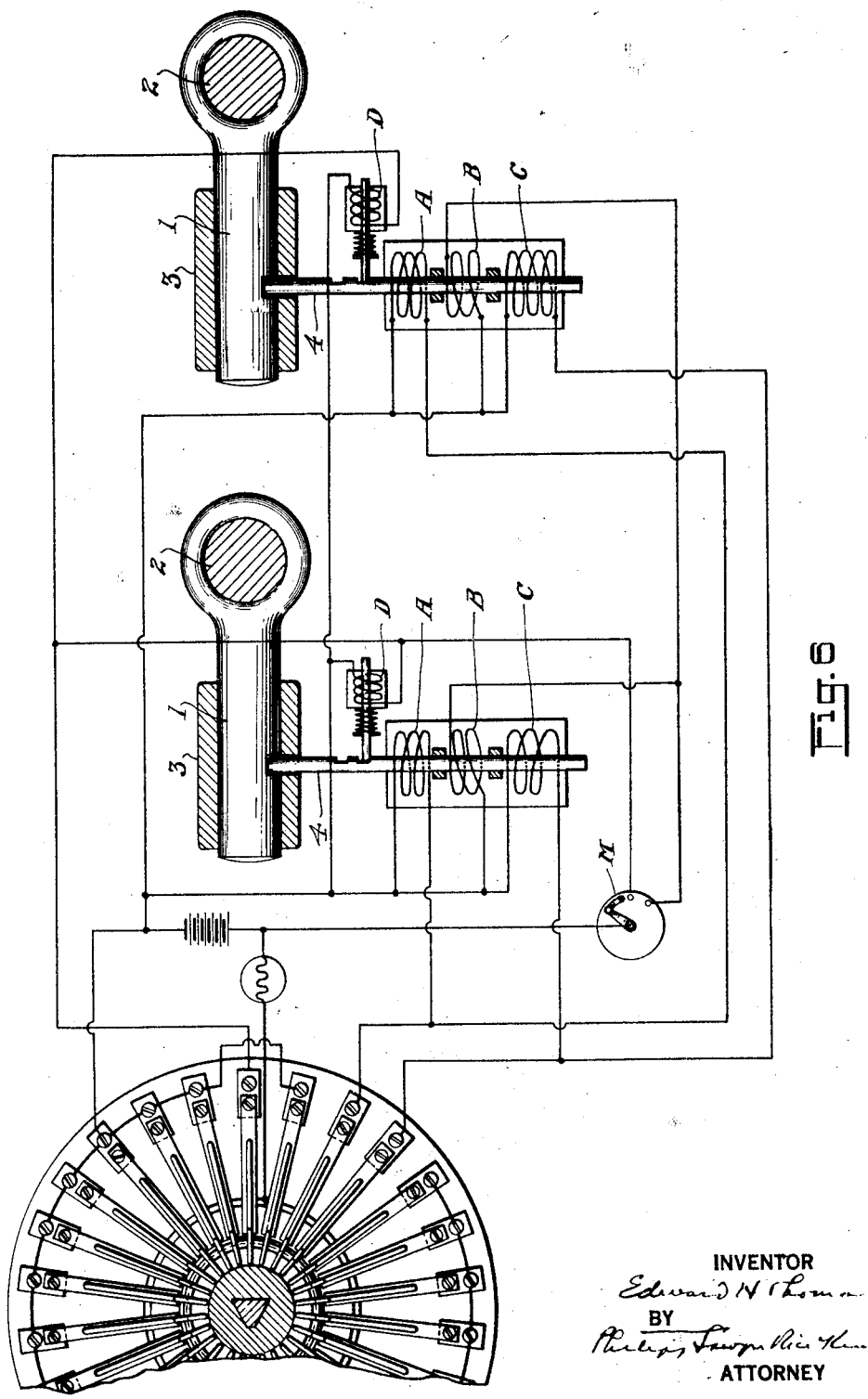

Figure 5 a diagrammatic illustration indicating the relative position of the key slots; and Figure 6 a view similar to Fig. 1, showing multiple bolts controlled by one key mechanism.

While the locking device has general application for various uses, it will be particularly described as applied to an automobile.

The apparatus comprises a locking solenoid, two unlocking or retracting solenoids, and an electro-magnetic latch device. The locking solenoid and the retracting solenoids have a common plunger, which serves as the locking bar or bolt arranged to hold against movement some movable part of the automobile.

In the best embodiment of the invention illustrated in the drawings, the locking mechanism is arranged to lock the gear shift lever. In this construction, a slider 1 is so connected to the gear shift lever 2 that the two must move simultaneously in a forward and backward direction of the gear shift lever. A slight clearance laterally between the eye of the slider 1 and the sides of the gear shift lever will allow for any lateral swing of the gear shift lever. Hence, by locking the slider with the gear shift lever in the neutral position it will be impossible to start the car. The slider 1 moves in a suitable guiding device indicated at 3. The guiding device is provided with an opening and the slider 1 has a slot arranged to come in register with said opening when the gear shift lever is in its neutral position. A locking bar or bolt 4 is arranged to slide back and forth in a direction transverse to the direction of movement of the slider 1. This locking bar may be mounted in suitable guides indicated at 5 and has one end arranged to enter the opening in the guiding device 3 and the slot in the slider 1 when the latter is in register with said opening. The locking bolt 4 is of good magnetic material and serves as a common plunger for three solenoids A, B, and C. The first and third solenoids are so wound and so arranged in their circuits that when energized they will tend to move the locking bar 4 to its unlocked or retracted position, while the second solenoid B serves to move the locking bar into the slot in the slider 1 and thereby lock the same, and while energized to retain the locking bar in this position.

The locking bar 4 has two notches as indicated at 6 and 7. At 8 is shown a latch bar which is longitudinally slidable in suitable guides as indicated at 9. The latch bar 8 serves as a plunger for a latch solenoid D, which is arranged when energized to move the latch bar away from the locking bolt 4. A spring 10 serves to move the latch bolt yieldingly toward the locking bolt, so that when the latter is moved to a position when either of its notches 6 or 7 is opposite the latch bar the latter will be forced into such notch by the spring 10 thereby latching the locking bolt in its locked position and also in its unlocked position. The circuits for the respective solenoids will be fully described hereinafter.

The locking mechanism constituting this invention also comprises a suitable key-actuated switch device arranged to control the circuits in which the four solenoids A, B, C and D are located. In addition to this key-actuated switch device there is provided a two-contact switch arranged to be operated manually for controlling the circuits in which the latch solenoid D and the locking solenoid B are included. The two-contact switch may be secured to the key-actuated ignition switch so that when the ignition switch is turned off, that is opened, the two-contact switch will be moved to close the circuit first of the latch solenoid D and then of the solenoid B and then to open both said circuits in the same order.

The key-actuated switch device comprises a plurality of spring contact switches arranged to be operated by a corresponding number of switch levers so located in a keyway that when a key is inserted the said switch levers will be operated by the key. If the key is the proper one for the particular car, three of the switch levers will be operated to close their respective spring contact switches and thereby close the proper circuits to the latch solenoid and the two unlocking solenoids, to unlock the car. If, however, a key be inserted which is not the proper one, the said three switch levers will not be operated to close their respective circuits, but another switch lever will be operated to short-circuit the solenoids.

In the particular embodiment of the invention illustrated in the drawings, the key-actuated switch mechanism is constructed and operates as follows:—

To a suitable base E of insulating material, for example, bakelite, there is secured therein the bottom plate E' of a central post or pin F which is of an unsymmetrical polygonal cross-section, to enter the corresponding shaped bore of a key F' which will be more fully described hereinafter. The base E also carries a slotted tubular supporting device G in the slots of which are received a series of switch levers H, whose fulcrum, which is in the form of a spring ring as indicated at 11, is mounted in an annular groove machined in the outer surface of said tubular supporting device. Each switch lever has its upper arm so constructed as to be resilient, for a purpose hereinafter explained, and at its upper end it is provided with an inward projecting nose 13. The lower arm carries at its lower end a lower inward projecting nose 14 and an outward projecting switch operating arm.

Beneath each of the switch levers, there is a plate spring contact device or switch J secured at one end to the slotted supporting device G and extending outward its outer end being provided with an adjustable contact device, for example, an ordinary contact screw, as indicated at 15.

A plurality of contact plates are provided, these being secured to the upper part of the insulating base E. These contact plates are indicated by different small letters of the alphabet, as a, b, c, d, . . . z. Each contact plate is provided with a terminal screw 16 to which a conductor may be attached as more fully explained hereinafter, and each contact plate is arranged to co-act with its corresponding spring contact device J.

The key which operates the switch levers has, as hereinafter stated, a bore of unsymmetrical cross-section to fit the post F, and exteriorly, has a lower cylindrical portion 17, and above this a tapered portion 18. The cylindrical portion has a length slightly greater than the length of a switch lever H. The cylindrical portion of the key is provided with three radial grooves 19, 20 and 21 which are in overlapping or echelon relation to each other, as indicated by the developed view, Fig. 5. The arrangement of these grooves is different for different keys, the grooves being spaced circumferentially in the cylindrical portion of the key, so that the spacing of each key will be different from any other key of the set having the same cross-section of bore. The purpose of this will be obvious from the following:

If the insulating base is provided with, say, 26 contact plates, and only three of these need be utilized for connection to the three circuits which include the latch solenoid D and the two unlocking solenoids A, C, it is obvious that there will be 15,600 different ways of connecting the three circuits to the said contact plates. The drawing shows the said circuits connected so as to include contact plates a, c and d. In this case, the corresponding switch levers for these contacts must operate properly to close their respective contact springs seriatim against these contact-plates a, c and d. In order to operate the proper switch levers, the key must have its three grooves so spaced that they will aline with the switch levers which said key must actuate to close its three unlocking circuits. As there are 15,600 different ways of connecting the three circuits to 26 contact plates, there can be 15,600 keys in a series of keys having the same cross-section of bore to fit the central post F. As a large number of cross-section shapes can be given to such central posts and bores of the keys, it is obvious that the total number of keys which may be provided, each one unlike any other, is practically unlimited.

When there are 26 contact plates, spring contact devices and switch levers, only three of the contact plates being connected to the unlocking circuits, the remainder of the contact plates may be wired together and thereby connected to one conductor serving to short-circuit the battery, as explained hereinafter.

When the proper key is inserted in the switch device the switch levers whose lower inward projecting ends are opposite the grooves in the key are free to swing and will be swung on their pivots as soon as their upper ends are forced outward by the tapered intermediate portion 18 of the key. Those switch levers which are not provided with corresponding grooves in the key, cannot swing on their pivots because there is no slot for their lower inward extending portion to enter. Hence, the upper resilient parts of such levers merely spring outward under the action of the tapered intermediate portion of the key, as illustrated at the left hand side of Fig. 2.

Where a key is used having grooves, but at the wrong places around the circumference of the key, the grooves allow the switch levers opposite them to swing on their pivots, thereby closing a circuit through their respective contact plates. This, however, closes the short-circuit for the battery and cannot operate the unlocking device.

The circuit connections are as follows:

One terminal of each of the solenoids A, B, C and D is connected to one pole of the battery L, in the present example the positive pole. The respective other terminals of the latch solenoid D and of the unlocking or retracting solenoids A and C are connected to separate contact plates, by separate conductors as indicated at 22, 23, 24. The negative pole of the battery is connected to the hub of the slotted supporting device G of the switch mechanism by a conductor as indicated at 25. In this conductor there may be any suitable signal devices such as a lamp or an electromagnetic bell. Instead of these signal devices, a fuse may be included in the circuit with said conductor. The signal devices are so arranged that they will not be materially affected by a relatively light current. The positive pole of battery L is connected by a conductor 26 to a contact plate which serves only for short circuiting the battery, for example to contact plate $x$ which in turn is connected by a wire 27 to all other contact plates except three, viz, $a$, $c$ and $d$.

The operation of the locking mechanism will now be described.

Assuming the apparatus is in its locked position, the key will be put in place on the central post F. This will cause the operation of three switch levers which aline with the three grooves in the key. Owing to the echelon or overlapping relation of these three grooves, their switch levers operate seriatim so that first the circuit including the latch solenoid D is closed, then the circuit for the unlocking solenoid A is closed and finally the circuit for the unlocking or retracting solenoid C is closed. The current through the latch solenoid D causes the latch bar to be pulled out of the notch in the locking bar and held in its unlatched position. The currents through the two unlocking coils A and C give a combined pull on the locking bar 4 sufficient to draw the latter out of engagement with the slider 1. The coils A and C are so dimensioned that neither alone will be sufficient to pull out the locking bar 4. Hence, when the circuit of coil A is closed, first, it merely stresses the bar 4 without actually moving it. Then when the circuit of coil C is closed, the locking bar 4 is quickly pulled out.

As the key is withdrawn, the switch lever which closes the circuit of the latch solenoid D is swung back and opens the circuit. Thereupon the spring 10 acting on the latch bar 8 is free to force the same into its latching position, that is the latch bar springs into the notch 6 in the locking bar and thereby latches said locking bar in its unlocked position. Also, the circuits for coils A and C are opened, thus cutting off the current from said coils. The car mechanism is now freed so that the car may be operated as usual.

During the above operation of the switch, the two-contact switch device is open.

When the operator desires to lock his car, he puts the gear shift lever in its neutral position and moves the two-contact switch M so that first it closes the circuit through the latch solenoid D, thereby retracting the latch bar from the notch in the locking bolt, and, second, while keeping the latch solenoid energized, it closes the circuit through the locking solenoid B thereby energizing the latter and causing it to force the locking bolt into engagement with the notch in the slider 1. Then the two-contact switch M is turned to open the said locking solenoid circuit and the latch solenoid circuit, thus releasing the latch bar and allowing it to be pushed by its spring into the notch 7 in the locking bolt.

It is obvious that with the locking mechanism of this invention if there be used a key which has grooves for the switch levers to enter, but which does not have the grooves properly spaced, the result will be to operate some of the switch levers which serve to close the battery short circuit, thus causing a heavy current to flow over the conductor 25 which leads from the hub of the slotted supporting device G of the switch mechanism to the negative pole of the battery. If there be a signal device inserted in this conductor, for example, a bell, it will ring. If it be a lamp it will light up. If it be a fuse the latter will be blown so as to break the circuit. In the latter case the locking mechanism will be put out of action until repaired by replacing the fuse.

The key-operated switch mechanism may be placed at any suitable distance from the bolt mechanism the wires connecting them being readily extended from one to the other. In any automobile the key-operated switch mechanism may be enclosed in such a manner that it cannot be got at without dismantling the car. For example it may be enclosed in the transmission casing together with the solenoids the locking bar and the latch bar.

The key for a car is supposed to be cut with the proper grooves about the time a car is delivered to the purchaser at which time the conductors $a$, $c$ and $d$ will be connected to the corresponding three contact plates of the series and the remainder of the plates connected to the short circuit conductor 25.

The grooves in the respective keys may be cut by a suitable milling machine having a cutter and a rotary chucking device with a dividing head, which chucking device will securely hold the key for cutting and allow it to be rotated about its longitudinal axis to any one of the plurality of positions selected on the dividing head dial.

Instead of providing the key-operated switch mechanism with a large number of sets of coacting switch-levers, spring contact devices and contact plates, only four such sets may be used, and these four sets differently spaced around the central post of different cars. This amounts merely to omitting all the switch levers, spring contact devices and contact plates that are used to short circuit the battery, with the exception of one cooperating set of such parts connected directly by the conductor 26 to the positive pole of the battery.

In order to reduce the diameter of the key, the grooves in the key may be made as narrow as possible, and the switch levers may have their two projecting arms 27 and 28 tapered or reduced in thickness at their ends, so as to enter said grooves, as will be clear from the drawings.

It will be clear from the above description that one key-switch mechanism may be employed to operate a plurality of bolt mechanisms. This is shown diagrammatically in Fig. 6 where two bolt-mechanisms are shown with their corresponding coils connected in multiple, and one key-switch mechanism arranged to operate both.

What I claim is:

1. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, of a key-actuated series of switch levers, circuit connections between three of said switch levers and the said electro-magnetic means and the said solenoids, respectively, a source of electric energy for energizing said circuits whereby when said three switch levers are operated to close their respective circuits the latch bar will withdraw from the notch in the locking bar and the latter will be retracted, and a circuit arranged to be closed by another switch lever to short circuit the said source of energy.

2. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, a solenoid for moving said locking bar to locking position, of a key-actuated series of switch levers, circuit connections between three of said switch levers and the said electro-magnetic means and the said solenoids, respectively, a source of electric energy for energizing said circuits whereby when said three switch levers are operated to close their respective circuits the latch bar will withdraw from the notch in the locking bar and the latter will be retracted, and a circuit arranged to be closed by another switch lever to short circuit the said source of energy.

3. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, of a series of switch levers, a key post of unsymmetrical cross-section adjacent the switch levers, arranged to receive a key having an unsymmetrical bore similar to the cross section of said post, three of said switch levers being arranged to be actuated by the key when it is moving onto the post, circuit connections between said three switch levers and the said electro-magnetic means and the said solenoids, respectively, a source of electric energy for energizing said circuits whereby when said three switch levers are operated to close their respective circuits the latch bar will withdraw from the notch in the locking bar and the latter will be retracted, and a circuit arranged to be closed by another switch lever to short circuit the said source of energy.

4. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, and a solenoid for moving said locking bar to locking position, of a key-post of unsymmetrical cross-section, arranged to receive a key having an unsymmetrical bore similar to the cross section of said post, a series of switch levers arranged around said post, three of said switch levers being arranged to be actuated by said key when the key is being put onto said post, circuit connections between said three switch levers and the said electro-magnetic means and the said solenoids, respectively, a source of electric energy for energizing said circuits whereby when said three switch levers are operated to close their respective circuits the latch bar will withdraw from the notch in the locking bar and the latter will be retracted, and a circuit arranged to be closed by other switch levers to short circuit the said source of energy.

5. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, of a key post of unsymmetrical cross-section arranged to receive a key having a bore of unsymmetrical cross-section to receive said post and having a tapered portion and a lower cylindrical portion provided with overlapping radial slots in its circumference, said slots being less in number than the number of switch levers and arranged to register with certain of the switch levers, a series of switch levers arranged about said key-post, three of said levers being arranged to enter the slots in the key when the key is put on the key-post, the remaining switch levers being arranged to be swung by the tapered portion of the key as it moves over the post, circuit connections extending from those switch levers with which the key slots register to the said electro-magnetic means and to the said solenoids, respectively, a source of electric energy for energizing said circuits whereby when said switch levers with which the key slots register are operated to close their respective circuits the latch bar will withdraw from the notch in the locking bar and the latter will be retracted, and a circuit arranged to be closed by other switch levers to short circuit the said source of energy.

6. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, of a key-actuated series of switch levers, a plurality of spring contact devices operated by said switch levers, a plurality of contact plates arranged to coact with said spring contact devices, circuit connections between three of said contact plates and the said electro-magnetic means and the said solenoids, respectively, a source of electric energy for energizing said circuits whereby when the switch levers of said three contact plates are operated to close their respective circuits the latch bar will withdraw from the notch in the locking bar and the latter will be retracted, and a circuit arranged to be closed by other switch levers to short circuit the said source of energy.

7. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, a solenoid for moving said locking bar to locking position, said locking bar serving as a common plunger for said three solenoids, of a key-actuated series of switch levers, circuit connections between three of said switch levers and the said electro-magentic means and the said solenoids, respectively, a source of electric energy for energizing said circuits whereby when said three switch levers are operated to close their respective circuits the latch bar will withdraw from the notch in the locking bar and the latter will be retracted, and a circuit arranged to be closed by other switch levers to short circuit the said source of energy.

8. In a locking mechanism, the combination, with a locking bar having a notch, a latch bar arranged to enter said notch, means for forcing said latch bar into the notch, electro-magnetic means arranged to withdraw said latch bar from said notch, and a pair of solenoids arranged when both are energized to retract the locking bar and when only one is energized only to stress the locking bar without retracting it, of a key-actuated series of switch levers, circuit connections between three of said switch levers and the said electro-magnetic means and the said solenoids, respectively, a source of electric energy for energizing said circuits whereby when said three switch levers are operated to close their respective circuits the latch bar will withdraw from the notch in the locking bar and the latter will be retracted, a circuit arranged to be closed by other switch levers to short circuit the said source of energy, a manually operated two-contact switch and circuit connections from the two contact switch to the electro-magnetic latch operating means and to the locking solenoid, respectively.

In testimony whereof, I have hereunto set my hand.

EDWARD H. THOMAS.